(12) United States Patent  
Brooks

(10) Patent No.: US 8,038,894 B2
(45) Date of Patent: Oct. 18, 2011

(54) METHOD OF SELECTIVELY STRIPPING AN ENGINE-RUN CERAMIC COATING

(75) Inventor: William Clarke Brooks, Lebanon, OH (US)

(73) Assignee: General Electric Company, Schenectady, NY (US)

( * ) Notice: Subject to any disclaimer, the term of this patent is extended or adjusted under 35 U.S.C. 154(b) by 758 days.

(21) Appl. No.: 11/564,639

(22) Filed: Nov. 29, 2006

(65) Prior Publication Data

US 2008/0121623 A1 May 29, 2008

(51) Int. Cl.
B44C 1/22 (2006.01)

(52) U.S. Cl. ............ 216/52; 216/96; 216/100; 216/101; 216/108

(58) Field of Classification Search .................. None
See application file for complete search history.

(56) References Cited

U.S. PATENT DOCUMENTS

| | | | | |
|---|---|---|---|---|
| 3,544,348 A * | 12/1970 | Boone et. al. ................. | 427/142 |
| 3,779,879 A * | 12/1973 | Scott ............................. | 205/717 |
| 4,302,246 A * | 11/1981 | Brindisi et al. ................ | 75/715 |
| 4,339,282 A * | 7/1982 | Lada et al. ..................... | 134/3 |
| 4,425,185 A * | 1/1984 | Fishter et al. .................. | 216/103 |
| 4,655,383 A | 4/1987 | Fournes et al. | |
| 5,723,078 A | 3/1998 | Nagaraj et al. | |
| 5,944,909 A * | 8/1999 | Reeves et al. .................. | 134/3 |
| 6,238,743 B1 | 5/2001 | Brooks | |
| 6,294,072 B1 | 9/2001 | Fairbourn | |
| 6,379,749 B2 | 4/2002 | Zimmerman et al. | |
| 6,758,985 B2 | 7/2004 | Brooks | |
| 6,833,328 B1 | 12/2004 | Kool et al. | |
| 2005/0127039 A1 | 6/2005 | Rosenzweig et al. | |
| 2006/0127694 A1 * | 6/2006 | Hazel et al. ................... | 428/652 |

* cited by examiner

*Primary Examiner* — Duy Deo

(74) *Attorney, Agent, or Firm* — William Scott Andes; Gary M. Hartman; Domenica N. S. Hartman

(57) ABSTRACT

A process for selectively stripping a coating from a component of a turbomachine, and particularly a coating having a ceramic matrix that contains metallic particles dispersed therein that render the coating more difficult to remove from the component after the component has been subjected to elevated temperatures during operation of the turbomachine. The process generally includes immersing the component in an aqueous solution containing ferric chloride, nitric acid, and phosphoric acid, for a duration sufficient to attack the metallic particles in the coating. The component is then removed from the aqueous solution and its surface rinsed of the aqueous solution. The immersing and removing steps are then sequentially repeated a sufficient number of times to sufficiently attack the metallic particles to enable the coating to be mechanically removed from the component.

19 Claims, 1 Drawing Sheet

METHOD OF SELECTIVELY STRIPPING AN ENGINE-RUN CERAMIC COATING

BACKGROUND OF THE INVENTION

This invention relates to methods of chemically removing ceramic-based coatings from surfaces of components, such as components exposed to the hot gas path of gas turbine engines and other turbomachinery. More particularly, this invention is directed to a method of chemically stripping a metal particle-containing ceramic coating from such components with an acidic stripping solution containing ferric chloride, nitric acid, and phosphoric acid.

The operating environment within a gas turbine engine is both thermally and chemically hostile. Significant advances in high temperature strength, creep resistance, and fatigue resistance have been achieved through the formulation of iron, nickel and cobalt-based superalloys. Nonetheless, components in the hot gas path of a gas turbine engine are often protected by one or more coatings that provide thermal and/or environmental protection. Common examples include metallic environmental coating used alone or in combination with a ceramic thermal barrier coating (TBC), which in the latter case the environmental coating is termed a bond coat for the TBC. Components protected by environmental coatings and TBC systems exhibit greater durability as well as afford the opportunity to improve efficiency by increasing the operating temperature of a gas turbine.

Metal oxides, and particularly zirconia ($ZrO_2$) partially or fully stabilized by yttria ($Y_2O_3$), magnesia (MgO), ceria ($CeO_2$), calcia (CaO), and/or one or more other oxides, have been widely employed as TBC materials. TBC's are typically deposited by flame spraying, air plasma spraying (APS), low pressure plasma spraying (LPPS), or a physical vapor deposition (PVD) technique such as electron beam physical vapor deposition (EBPVD), which yields a strain-tolerant columnar grain structure. TBC adhesion typically requires the use of a bond coat, for example, a diffusion coating such as a diffusion aluminide or platinum aluminide, or an overcoat alloy such as MCrAlX alloys (where M is iron, cobalt and/or nickel, and X is an active element such as yttrium or a rare earth or reactive element) or an aluminide intermetallic (e.g., beta-phase and gamma-phase nickel aluminides). The aluminum content of these bond coat materials provides for the growth of an alumina ($Al_2O_3$) scale that protects the underlying substrate from oxidation and hot corrosion and promotes chemical bonding of the TBC.

The need to remove and replace a TBC typically arises as a result of erosion or impact damage to the TBC during engine operation, or to repair certain features such as the tip length of a turbine blade. Removal of a TBC may also be necessitated during component manufacturing to address post-coating problems such as defects in the coating, handling damage, and the need to repeat noncoating-related manufacturing operations which require removal of the ceramic, e.g., electrical-discharge machining (EDM) operations. Current state-of-the-art methods for repairing components protected by TBC often result in removal of the entire TBC system, i.e., both the ceramic TBC and the bond coat, after which the bond coat and TBC must be redeposited. One such method is to use abrasives in procedures such as grit blasting, vapor honing and glass bead peening, each of which is a slow, labor-intensive process that erodes the TBC and bond coat. As such, significant efforts have been to develop nonabrasive processes for removing TBC. Examples include autoclaving processes at elevated temperatures and pressures using caustic compounds such as hydroxides, fluoride ion cleaning, and high temperature treatments with chloride. However, each of these techniques generally has the disadvantage of being slow, which significantly limits throughput and results in relatively long turnaround times. A more rapid technique for removing TBC is disclosed in commonly-assigned U.S. Pat. No. 5,614,054 to Reeves et al. as employing a halogen-containing powder or gas, preferably ammonium fluoride ($NH_4F$). Still other treatments include the use of aqueous solutions containing an acid fluoride salt, such as ammonium bifluoride ($NH_4HF_2$) or sodium bifluoride ($NaHF_2$), as disclosed in commonly-assigned U.S. Pat. Nos. 6,238,743, 6,379,749 and 6,758,985.

While the above treatments represent significant advancements in TBC removal, variations in composition can render certain coatings more difficult to remove than others. Examples include ceramic coatings having compositions tailored to provide a barrier to hot corrosion for components whose substrate compositions and/or operating environments render the components particularly susceptible to hot corrosion. Such is the case with certain hot section rotating hardware, including mid seals, blade retainers, and high pressure turbine (HPT) disks of high-performance gas turbine engines. Various corrosion barrier coating materials have been proposed for such applications, including those noted and discussed in commonly-assigned U.S. Patent Application Publication Nos. 2005/0138805 and 2006/0127694, whose contents regarding coating compositions and coating processes are incorporated herein by reference. As an example, both of these publications described corrosion barrier coating materials comprising binder systems that may contain phosphates and/or chromates, with the latter publication (now U.S. Pat. No. 7,314,674 to Hazel et al.) disclosing a corrosion barrier coating that may comprise a phosphate-chromate binder containing zirconium oxide (zirconia; $ZrO_2$) and metallic particles, such as an MCrAlX composition, where M is preferably nickel or nickel and cobalt, and X is preferably yttrium or a rare earth or reactive metal. This metal particle-containing ceramic coating can be deposited by spraying a slurry directly on a substrate surface to be protected, and then curing the phosphate-chromate binder at an elevated temperature. An optional and generally nonfunctional ceramic or glassy top coat can be deposited over the hot corrosion barrier coating to achieve a generally cosmetic effect. The composition of this metal particle-containing ceramic coating is tailored to provide a protective barrier to hot corrosion and have a coefficient of thermal expansion (CTE) approximately matching that of the underlying superalloy substrate to promote its spallation resistance.

Acceptable methods for removing coatings from critical rotating hardware can be limited to the use of 500 mesh alumina as a grit blasting media. While these methods have been found capable of removing the above-noted metal particle-containing ceramic coating prior to engine service, for example, if post-coating repairs are needed, they have not been successful at removing this coating if the coated parts are being returned after engine service. Though not wishing to be held to any particular theory, oxidation products and dirt that is converted to a glass-like substance at the high temperatures within the hot gas path of a turbine engine are believed to make removal of the coating difficult. As such, further treatment methods and solutions are needed to remove this coating material.

BRIEF SUMMARY OF THE INVENTION

The present invention generally provides a process for selectively stripping a coating from a component of a turbomachine, and particularly a coating having a ceramic matrix that contains metallic particles dispersed therein that render the coating more difficult to remove from the component after the component has been subjected to elevated temperatures during operation of the turbomachine. While it is foreseeable that other examples exist, a particularly notable example of such a coating is the aforementioned metal particle-containing ceramic coating, disclosed in the aforementioned commonly-assigned U.S. Pat. No. 7,314,674 to Hazel et al.

The processing steps of this invention generally include immersing the component in an aqueous solution containing, per liter, about 150 to about 185 grams of ferric chloride, about 85 to about 105 grams of nitric acid, and about 125 to about 155 grams of phosphoric acid. The component is immersed in the aqueous solution for a duration sufficient to attack the metallic particles in the coating. The component is then removed from the aqueous solution and its surface rinsed of the aqueous solution. The immersing and removing steps may be sequentially repeated any number of times to sufficiently attack the metallic particles to enable the coating to be mechanically removed from the component.

According to the invention, though hot corrosion barrier coatings formed of the aforementioned metal particle-containing ceramic material have been found to be extremely difficult to mechanically remove after engine service, the chemical treatment of this invention has been shown to chemically attack the metallic particles within this ceramic material in a manner than renders the ceramic material as a residue that can be mechanically removed, such as by light abrasive grit blasting, with little or no damage to the substrate underlying the ceramic material, such as a superalloy substrate or a metallic bond coat.

Other objects and advantages of this invention will be better appreciated from the following detailed description.

DETAILED DESCRIPTION OF THE INVENTION

Figure 1:
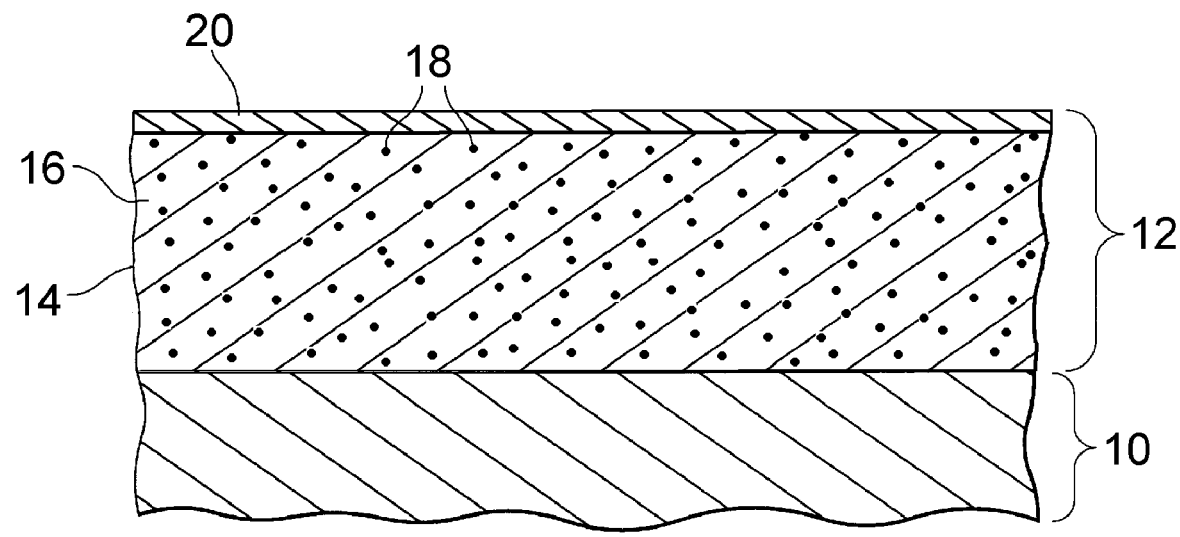
FIG. 1 is a schematic cross-sectional view of a metal particle-containing ceramic coating of a type that can be removed with the stripping processing of this invention.

The present invention is generally applicable to metal components that are prone to degradation as a result of operating within high temperature oxidizing and/or corrosive environments, and therefore benefit from being protected by an environmental barrier coating such as a corrosion barrier coating. Notable examples of such components include rotating hardware in the hot gas flow path of gas turbine engines, such as mid seals, blade retainers, and high pressure turbine (HPT) disks. Various high-temperature materials can be used to form these components, a notable example of which is a gamma prime (γ') precipitate-strengthened nickel-base superalloy commercially-known as René 88DT (R88DT), disclosed in U.S. Pat. No. 4,957,567 as having a composition of, by weight, about 15.0-17.0% chromium, about 12.0-14.0% cobalt, about 3.5-4.5% molybdenum, about 3.5-4.5% tungsten, about 1.5-2.5% aluminum, about 3.2-4.2% titanium, about 0.5-1.0% niobium, about 0.010-0.060% carbon, about 0.010-0.060% zirconium, about 0.010-0.040% boron, about 0.0-0.3% hafnium, about 0.0-0.01 vanadium, and about 0.0-0.01 yttrium, the balance nickel and incidental impurities. While the advantages of this invention will be described with reference to such components and superalloys, the teachings of this invention are generally applicable to a variety of other components and materials that benefit from being protected by an environmental barrier coating.

According to this invention, a process is provided by which a ceramic environmental barrier coating containing metallic particles can be stripped from components of the type described above without damaging the underlying superalloy substrate. In particular, the invention provides a stripping solution and process capable of removing a metal particle-containing ceramic coating, such as a corrosion barrier coating disclosed in the aforementioned U.S. Pat. No. 7,314,674 to Hazel et al. as comprising a phosphate-chromate binder material containing zirconia and metallic particles. FIG. 1 represents a partial cross-sectional view of a surface region of a substrate 10 protected by such a ceramic coating 14. The substrate 10 is preferably a region of a gas turbine engine turbine component, such as a mid seal, blade retainer, HPT disk, etc., formed of R88DT or another suitable superalloy. The ceramic coating 14 is shown as being part of a coating system 12 that includes an optional top coat 20, which may have a ceramic or glassy composition. As taught by Hazel et al., the top coat can comprise a particulate component, but is typically substantially free of particulates, and is formed from a sealant composition or a composition that consists essentially of, or entirely of, a glass-forming binder component to form a glassy outer sealant layer. The ceramic coating 14 can be formed by applying (for example, spraying) a slurry that contains zirconia and metallic particles in a phosphate-chromate binding system, which after curing at a suitable temperature forms a phosphate-chromate binder matrix 16 in which the zirconia and metallic particles 18 are uniformly dispersed.

While a variety of corrosion-resistant metal compositions are known and could be used, the metallic particles 18 are preferably formed of an MCrAlX composition, where M is preferably nickel or nickel and cobalt, and X is preferably yttrium or a rare earth or reactive metal. Also suitable for the metallic particles 18 are other corrosion-resistant metal compositions taught by Hazel et al., namely, metal alloys having the formula MCr, MAl, MCrAl, MCrAlX, or MAlX, wherein M is nickel, cobalt, iron, etc., or an alloy thereof and wherein X is hafnium, zirconium, yttrium, tantalum, platinum, palladium, rhenium, silicon, etc., or a combination thereof. A suitable size for the particles 18 is on the order of about 5 to about 10 micrometers, though lesser and greater particle sizes are possible, for example, particle sizes in the range of about 0.01 to about 50 micrometers, more typically in the range of about 0.1 to about 25 micrometers, as taught by Hazel et al. Finally, and as also taught by Hazel et al., the ratio of the metallic particles 18 to the phosphate-chromate binder matrix 16 is typically in the range of, by weight, about 0.1 to about 10, more typically in the range of from about 0.5 to about 5. The metallic particles 18 combined with zirconia (not shown) in the phosphate-chromate binder matrix 16 serve to provide hot corrosion protection at engine operating temperatures of, for example, up to about 1400° F. (about 760° C.). However, the particles 18 are also believed to render the ceramic coating 14 more difficult to remove after being subjected to elevated temperatures within a gas turbine engine, particularly if the substrate 10 is a hot gas path component such as a mid seal, blade retainer, or HPT disk. Whereas mechanical cleaning techniques such as abrasive grit blasting have been found to be capable of removing this metal particle-containing ceramic coating prior to engine service, such techniques are not successful once the component has been subjected to engine service, during which time oxidation plus glass-like deposits form that are difficult to remove by mechanical methods alone.

The present invention provides a stripping solution and a combined chemical and mechanical stripping process that has been shown to successfully remove the metal particle-containing ceramic coating 14 described above. As an initial step, the component is preferably cleaned of surface debris, dirt, and other contaminants that often collect on the ceramic coating 14 and top coat 20 during engine operation. The component is then immersed in an aqueous acidic stripping solution containing ferric chloride ($FeCl_3$), phosphoric acid ($H_3PO_4$), and nitric acid ($HNO_3$). A preferred stripping solution contains, per liter of solution, about 168 grams of ferric chloride, about 95 grams of nitric acid, and about 140 grams of phosphoric acid, the balance essentially water (preferably but not necessarily distilled or de-ionized water). These values are considered nominal, as acid concentrations of ±10% of these values are believed to be equally or nearly as effective. As such, a suitable aqueous solution may contain, per liter, about 150 to about 185 grams of ferric chloride, about 85 to about 105 grams of nitric acid, and about 125 to about 155 grams of phosphoric acid. A risk exists of the substrate 10 being attacked if the upper limits of these ranges are exceeded, whereas the particles 18 may not be adequately attacked if the acidic ingredients of the stripping solution are below the lower limits of their respective ranges.

The stripping solution is preferably at ambient temperature (about 25° C.) during use, though temperatures in a range of about 20° C. to about 30° C. are believed to be acceptable. Below this range, the stripping reaction can be excessively slow, whereas temperatures above this range risk attack of the substrate 10. A suitable immersion duration is up to about one hour, during which time the aqueous solution is believed to attack the metallic particles 18 within the ceramic coating 14 as a result of the acid chlorides in the presence of nitric acid and iron dissolving the MCrAlX alloy from which the particles 18 are formed. Following this treatment, the surface of the component (the surface of the ceramic coating 14) is rinsed (preferably with water), and then preferably mildly agitated such as with a soft bristle brush to loosen and help remove residues that form as byproducts of the stripping reaction.

The ceramic coating 14 is unlikely to be ready for removal after a single immersion-rinse cycle, and therefore the immersion and rinsing steps are preferably repeated until the metallic particles 18 are sufficiently dissolved to leave the zirconia and phosphate-chromate matrix as a soft residue. A total of six hours of immersion is believed to be an upper limit for treatment with the stripping solution to prevent excessive attack of the substrate 10. After the final immersion and rinse, the soft residue of the ceramic coating 14 is allowed to dry, after which the residue can be mechanically removed. A preferred technique is grit blasting with a fine (e.g., about 500 mesh) alumina particulate. Removal of the residue can be confirmed visually or with a suitable measuring technique, such as the use of a volt ohm meter (VOM) that can detect the absence of the ceramic coating 14 based on the electrical resistance at the component surface dropping to essentially zero. Following removal of the matrix residue, a new coating can be deposited on the substrate 10.

The process described above has been successfully demonstrated on coupons and seal segments formed of the R88DT superalloy coated with an approximately 0.002 inch thick (about 50 micrometers) layer of the metal particle-containing ceramic coating 14 described above, overcoated with an approximately 0.0005 inch thick (about 10 micrometers) ceramic top coat 20. Previous to the stripping treatment of this invention, the coupons had been subjected to three hundred furnace cycles at about 1400° F. (about 760° C.), whereas the seal segments were engine-run hardware. The stripping solution had a nominal composition of, per liter, about 168 grams of ferric chloride, about 95 grams of nitric acid, and about 140 grams of phosphoric acid, the balance water. With the solution at about 25° C., the coupons and seal segments were immersed for about one hour, removed and rinsed. This immersion and rinse cycle was repeated six times, at which point the coatings had been reduced to a soft residue. The residue was allowed to dry before being removed by grit blasting with 500 mesh alumina. Following removal of the residue, inspection of the coupons and seal segments showed that their substrate materials had not been attacked by the stripping solution. Additional R88DT specimens immersed in the stripping solution of this invention for up to eight hours were found to not have suffered any stock loss or intergranular attack, evidencing that the preferred six-hour cumulative immersion limit is a safe upper limit for the stripping process of this invention.

While the invention has been described in terms of particular embodiments, it is apparent that other forms could be adopted by one skilled in the art. Accordingly, the scope of the invention is to be limited only by the following claims.

The invention claimed is:

1. A process of selectively stripping a coating system from a component of a turbomachine, the coating system comprising a corrosion barrier coating and optionally at least one top coating overlying the corrosion barrier coating, the corrosion barrier coating comprising a ceramic matrix containing a phosphate-chromate binder and metallic particles dispersed in the ceramic matrix, the coating system containing a glass composition in at least one of the corrosion barrier and top coatings, the metallic particles being formed of a corrosion-resistant metal alloy having a formula chosen from the group consisting of MCr, MAl, MCrAl, MCrAlX, and MAlX, wherein M is nickel, cobalt, iron, or an alloy thereof, and wherein X is hafnium, zirconium, yttrium, tantalum, platinum, palladium, rhenium, silicon, or a combination thereof, the process comprising the steps of:

immersing the component in an aqueous solution containing ferric chloride, nitric acid, and phosphoric acid, the component being immersed in the aqueous solution for a duration sufficient to attack the metallic particles in the corrosion barrier coating;

removing the component from the aqueous solution and then rinsing the aqueous solution from the coating system;

sequentially repeating the immersing and removing steps a sufficient number of times to sufficiently attack the metallic particles to render the ceramic matrix as a soft residue that can be mechanically removed from the component; and then mechanically removing the soft residue to remove the coating system from the component.

2. The process according to claim 1, wherein the aqueous solution contains, per liter, about 150 to about 185 grams of ferric chloride, about 85 to about 105 grams of nitric acid, and about 125 to about 155 grams of phosphoric acid.

3. The process according to claim 1, wherein the ceramic matrix contains zirconia.

4. The process according to claim 1, wherein the ceramic matrix consists essentially of zirconia and the phosphate-chromate binder.

5. The process according to claim 1, wherein the metallic particles have a particle size range of about 0.01 to about 50 micrometers.

6. The process according to claim 1, wherein each immersing step is for a duration of up to one hour.

7. The process according to claim 1, wherein the component is immersed in the aqueous solution for a combined total duration of not more than six hours prior to mechanically removing the coating system from the component.

8. The process according to claim 1, wherein the coating system is mechanically removed by an abrasive grit blasting technique.

9. The process according to claim 1, wherein the surface of the coating system is rinsed with water and then physically agitated.

10. The process according to claim 1, wherein the aqueous solution is at a temperature of about 20° C. to about 30° C.

11. The process according to claim 1, wherein the aqueous solution contains, per liter, about 168 grams of ferric chloride, about 95 grams of nitric acid, and about 140 grams of phosphoric acid.

12. The process according to claim 1, wherein the component is a surface region of a gas turbine component.

13. The process according to claim 9, wherein the surface region is formed of a gamma prime precipitate-strengthened nickel-base superalloy.

14. The process according to claim 13, wherein the gamma prime precipitate-strengthened nickel-base superalloy has a composition of, by weight, about 15.0-17.0% chromium, about 12.0-14.0% cobalt, about 3.5-4.5% molybdenum, about 3.5-4.5% tungsten, about 1.5-2.5% aluminum, about 3.2-4.2% titanium, about 0.5.0-1.0% niobium, about 0.010-0.060% carbon, about 0.010-0.060% zirconium, about 0.010-0.040% boron, about 0.0-0.3% hafnium, about 0.0-0.01 vanadium, and about 0.0-0.01 yttrium, the balance nickel and incidental impurities.

15. A process of selectively stripping a coating system comprising a hot corrosion barrier coating and a top coating from a component after the component has been subjected to elevated temperatures within the hot gas path of a gas turbine engine, the hot corrosion barrier coating comprising a ceramic matrix containing a phosphate-chromate binder, metallic particles dispersed in the ceramic matrix, and oxidation products and glass-like substances that formed at the elevated temperatures in the hot gas path and render the hot corrosion barrier coating more difficult to remove from the component, the top coating consisting essentially of a glass composition, the process comprising the steps of:
  immersing the component in an aqueous solution containing, per liter, about 150 to about 185 grams of ferric chloride, about 85 to about 105 grams of nitric acid, and about 125 to about 155 grams of phosphoric acid, the component being immersed in the aqueous solution for a duration sufficient to attack the metallic particles in the hot corrosion barrier coating;
  removing the component from the aqueous solution and then rinsing and physically agitating the surface of the coating system;
  sequentially repeating the immersing and removing steps a sufficient number of times to sufficiently attack the metallic particles to render the ceramic matrix as a soft residue that can be abrasively removed from the component but not to exceed a combined total immersion duration of six hours; and then
  abrasively grit blasting the soft residue to remove the coating system from the component.

16. The process according to claim 15, wherein the ceramic matrix further contains zirconia.

17. The process according to claim 15, wherein the metallic particles are formed of an MCrAlX composition, where M is nickel or nickel and cobalt, and X is yttrium or a rare earth or reactive metal.

18. The process according to claim 15, wherein the aqueous solution is at a temperature of about 20° C. to about 30° C. and each immersing step is for a duration of up to one hour.

19. The process according to claim 15, wherein the aqueous solution contains, per liter, about 168 grams of ferric chloride, about 95 grams of nitric acid, and about 140 grams of phosphoric acid.

* * * * *